UNITED STATES PATENT OFFICE.

HALVOR HALVORSON, OF NASHUA, NEW HAMPSHIRE.

DESICCATING VEGETABLES.

SPECIFICATION forming part of Letters Patent No. 230,004, dated July 13, 1880.

Application filed April 8, 1880. (No specimens.)

*To all whom it may concern:*

Be it known that I, HALVOR HALVORSON, of Nashua, in the county of Hillsborough and State of New Hampshire, have invented certain Improvements in Methods of Desiccating Vegetables, of which the following is a specification.

My improved method of desiccating is employed in the preparation of the ordinary culinary vegetables, as squashes, pumpkins, carrots, parsnips, turnips, &c.; but it may be employed as well in the preparation of other vegetables or fruits, if it be found adapted to them.
In the ordinary methods of drying or desiccating vegetables, it is found that they lose, in a greater or lesser degree, their individual characteristics, both as to flavor and taste, which can never be restored by any known means.
This is due, as I believe, to the method of preparation, and I have sought by my process to produce a preparation that will possess, when subjected to the ordinary culinary processes, all of the characteristics of the fresh vegetable and be capable of resisting decomposing tendencies under all ordinary circumstances.

In carrying out my method of desiccating it is important that mature and sound vegetables shall be selected. These are washed or rinsed as clean as possible with water in any suitable manner and their skins removed. The manner of removing their skins will depend much upon the kind of vegetable in hand. Pumpkins, squashes, and the like I slice or cut in the direction of their longest growth into strips of any convenient size, and remove therefrom all the fibrous parts, which contain the seeds, so that the solid "flesh" of the vegetable shall be distinctly seen. I then skive off the skin from these strips with a wood-worker's shave or some other convenient instrument.

From bulbs, roots, or other vegetables whose forms approach that of a sphere, egg, or oval, I remove the skin by introducing them into a revolving drum, wherein they are tumbled until the friction against each other wears the skins away.
Long or brittle roots, like carrots, parsnips, &c., which might break on being submitted to the last-described process, may have their skins removed by being held up to a stiff revolving brush. I have found a wheel covered with old card-clothing to answer the purpose very well.

I only suggest the above methods of removing the skins of the vegetables as being economical and practical. Other methods may, of course, be employed.

The vegetables thus denuded of their skins are grated or ground fine in a machine similar to that employed for grating horse-radish or beets for sugar-making.

To prevent decomposition and discoloration of the pulp, which would otherwise be rapid and destructive, I collect it in a receptacle holding a solution of calcic bisulphite, adding more and more to the accumulating pulp, as required, as rendered evident by the change of color where enough of the bisulphite is not present.

Another object in receiving the pulp into water (present with calcic bisulphite) is to remove from the vegetable fiber as much as possible of the soluble constituents associated with it in the mature vegetable, for reasons that will be hereinafter named.

When a sufficient quantity of the pulp has been collected I remove the fibrous or solid parts to a press, preferably employing a sieve or colander for the purpose, so as to avoid transferring the more watery portions. In the press all that portion which can be is expressed, and the magma or residue is spread upon screens to dry. On a dry windy day this operation will proceed rapidly, provided the magma be stirred frequently and the lumps be broken up. Artificial heat serves to accelerate the process, but it is not indispensable.

Instead of employing a press, the pulp may be squeezed in clean burlaps or other textile material.

The expressed matter, which is more or less liquid, is conveyed as quickly as possible to a suitable vessel to be boiled. The ebulition should be rapid, during which a voluminous coagulum, which I believe to be albuminous, will form or gather on the surface. This should be skimmed off as fast as formed (until the liquid becomes clear) and thrown into a small quantity of cold water, wherein it is washed.

It is then taken out and pressed between cloths, and then added, by thorough mixing, to the drying magma or fibrous material. The clear liquid is then concentrated to a sirupy consistency, preferably in a vacuum-pan, when it is added to the magma or solid parts, which will ordinarily be dried by the time the concentration is completed. Before the liquid is added, however, the dried magma should be ground as fine as Indian meal, and then the concentrated juice be added, and the whole be well kneaded together and again spread out to dry, as at first. After the second drying it is again ground and sifted to any required degree of fineness, which completes the operation, it being only necessary to pack the desiccated product properly for sale and use, and to give it ordinary care, when it will keep sound and sweet in any climate and for an indefinite time.

I will here observe that some vegetables lose their identity to some extent when deprived of their water by concentration, as above described, either from the volatility of their essential principles, as in the case of carrots, or their constitutional water, as in the case of turnips, and in such cases I add the yelk of eggs, well beaten, to their liquids, in the proportion of, say, five yelks to one hundred pounds of the vegetable substance or pulp. This has the effect of fixing the fugitive aroma and taste, probably by reason of the oil of the yelk. Other fats would undoubtedly accomplish the same object; but I know of none less objectionable and more (or equally) effective and neutral than that above named. The small amount of albumen which accompanies the oil in the yelk is not of importance enough to require its separation. Another object in choosing yelk of eggs is that they add to the palatability of most vegetables when the same are cooked for the table, and consequently are entirely unobjectionable.

The rationale of my process is that the rapid decomposition of the albumen or coagulable constituents of the vegetable in its raw state is prevented by coagulation, while at the same time the vegetable is prepared in an uncooked state. The albumen or coagulable matter is the seat of decomposition, and in it resides the principal part of the flavor or aroma of the vegetable. In the ordinary manner of drying vegetables as a whole incipient decay occurs, while in my process the causes of decay are removed by the separation of the elements which co-operate for decay during the elimination of the water, as well as by the coagulation of the coagulable matters while separated from the fibrous portion or magma. Thus my product is composed in the main of uncooked vegetable matter; but it contains no appreciable amount of albuminous or coagulable matter not coagulated by heat.

Aside from the superior quality of its product, my process may be carried out in much less time than that required for desiccating pumpkins or squashes in the usual way of slicing and hanging up to dry. This requires from three to four weeks under favorable circumstances, and the product is unsightly and discolored and the flavor much impaired.

By preserving the vegetable in a practically uncooked state, the albuminous matters being coagulated by heat while separated from the mass, and by employing calcic bisulphite to prevent discoloration, I produce a product that, when cooked, can hardly be distinguished from the fresh vegetable.

The small amount of the bisulphite used (about four ounces to fifty pounds of the pulp) is converted into calcic sulphate (plaster-of-paris) by the absorption of oxygen, and this is mainly precipitated, the small percentage remaining in the vegetables being unobjectionable.

The skins or scrapings from the vegetables may be utilized as feed for cattle by carefully desiccating them, so that they will not decompose.

I am fully aware that calcic bisulphate has been largely used as an antiseptic agent, and that other chemicals and substances may be and are used for a like purpose; but I prefer to employ the calcic bisulphite in my process as the best antiseptic with which I am acquainted.

I am also aware that tomatoes have been desiccated by first expressing the major part of their water-juices and then drying out or evaporating the remainder. The juices, however, are not afterward added to them.

I am also aware that in making anchovy sauce the fish is pulped and the separated juices mixed with water and boiled, being afterward mixed with the fish-pulp and the whole boiled together.

None of these processes involves, however, the essential feature of my invention, which I conceive to be the removal of the albumen from the vegetable mass, its coagulation by heat while thus separated, and its admixture with the vegetable mass after coagulation.

The other steps of the process are important and even necessary to the perfect success of the process; but the above I believe to be the essential feature.

Having thus described my invention, what I claim is—

1. The method of desiccating vegetables herein described, which consists in treating the pulp with an antiseptic agent, then extracting the liquid and coagulable portions while the vegetable is in a raw state, drying the magma or solid parts, coagulating the coagulable portions, removing the same, then adding it to the magma and drying, concentrating the liquid portions by heat, mixing the whole together, redrying the mass, and reducing it to a powdered or granulated condition.

2. The method of desiccating herein described, which consists in first removing the skins from the vegetables; second, grating or grinding the same and subjecting the pulp to calcic bisulphite; third, expressing the liquid portions and drying the magma; fourth, boiling the liquid portions and removing the coagulable portion, which is then mixed with the magma; fifth, concentrating the liquid to a sirupy consistency and mixing it with the magma; and, lastly, drying and pulverizing the mass, substantially as set forth.

In witness whereof I have hereunto signed my name in presence of two subscribing witnesses.

HALVOR HALVORSON.

Witnesses:
J. FRANK ACKERMAN,
G. H. BURBANK.